(12) United States Patent
Tsao et al.

(10) Patent No.: US 9,669,316 B2
(45) Date of Patent: *Jun. 6, 2017

(54) SYSTEM AND METHOD FOR PROVIDING VIRTUAL ITEMS TO USERS OF A VIRTUAL SPACE

(71) Applicant: KABAM, INC., San Francisco, CA (US)

(72) Inventors: Bryan Tsao, San Carlos, CA (US); John Kim, San Francisco, CA (US); David McNeill, San Francisco, CA (US); Albert Wei, San Francisco, CA (US); Christopher Yu, San Francisco, CA (US); Kevin Chanthasiriphan, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/246,791

(22) Filed: Aug. 25, 2016

(65) Prior Publication Data

US 2016/0361656 A1 Dec. 15, 2016

Related U.S. Application Data

(63) Continuation of application No. 14/320,493, filed on Jun. 30, 2014, now Pat. No. 9,452,356.

(51) Int. Cl.
*A63F 13/00* (2014.01)
*A63F 13/847* (2014.01)
(Continued)

(52) U.S. Cl.
CPC ............ *A63F 13/847* (2014.09); *A63F 13/12* (2013.01); *A63F 13/335* (2014.09); *A63F 13/35* (2014.09);
(Continued)

(58) Field of Classification Search
CPC ...... A63F 13/55; A63F 13/822; A63F 13/825; A63F 13/847; A63F 2300/807; A63F 13/335; A63F 13/35
(Continued)

(56) References Cited

U.S. PATENT DOCUMENTS 5,816,918 A 10/1998 Kelly
5,933,813 A 8/1999 Teicher
(Continued)

FOREIGN PATENT DOCUMENTS

KR 1020130137431 12/2013
WO 0226333 1/2002
(Continued)

OTHER PUBLICATIONS

Gem System—Street Fighter X Tekken, http://www.streetfighter.com/us/sfxtk/features/gem-system, printed Nov. 6, 2012, 6 pages.
(Continued)

*Primary Examiner* — Allen Chan
(74) *Attorney, Agent, or Firm* — Sheppard Mullin Richter & Hampton LLP

(57) ABSTRACT

A system and method for providing virtual items to users of an online game operated in a virtual space. Multiple users may participate in affiliations or alliances of discrete groups of users in an online game and may access the online game through client computing platforms associated with the users. The affiliations may have affiliation game units associated with affiliations which provide a benefit to the members of the online game. Affiliation members may cumulatively obtain affiliation game units and/or upgrade affiliation game units by providing one or more virtual items. Upgrading affiliation game units may require the cooperation of multiple members of the affiliation.

22 Claims, 8 Drawing Sheets

(51) Int. Cl.
*A63F 13/30* (2014.01)
*A63F 13/335* (2014.01)
*A63F 13/35* (2014.01)
*G07F 17/32* (2006.01)
*H04L 29/06* (2006.01)
*A63F 13/795* (2014.01)

(52) U.S. Cl.
CPC ........ *A63F 13/795* (2014.09); *G07F 17/3244* (2013.01); *H04L 67/38* (2013.01)

(58) Field of Classification Search
USPC .......................................................... 463/42
See application file for complete search history.

(56) References Cited

U.S. PATENT DOCUMENTS

| | | |
|---|---|---|
| 5,964,660 A | 10/1999 | James |
| 6,142,472 A | 11/2000 | Kliebisch |
| 6,190,225 B1 | 2/2001 | Coleman |
| 6,402,619 B1 | 6/2002 | Sato |
| 6,561,904 B2 | 5/2003 | Locke |
| 6,604,008 B2 | 8/2003 | Chudley |
| 6,745,236 B1 | 6/2004 | Hawkins |
| 6,811,483 B1 | 11/2004 | Webb |
| 6,850,900 B1 | 2/2005 | Hare |
| 6,928,474 B2 | 8/2005 | Venkatesan |
| 7,076,453 B2 | 7/2006 | Jammes |
| 7,381,133 B2 | 6/2008 | Thomas |
| 7,533,336 B2 | 5/2009 | Jaffe |
| 7,660,740 B2 | 2/2010 | Boone |
| 7,682,239 B2 | 3/2010 | Friedman |
| 7,785,188 B2 | 8/2010 | Cannon |
| 7,813,821 B1 | 10/2010 | Howell |
| 7,819,749 B1 | 10/2010 | Fish |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster |
| 8,147,340 B2 | 4/2012 | BrunetdeCourssou |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf |
| 8,231,470 B2 | 7/2012 | Feeney |
| 8,239,487 B1 | 8/2012 | Hoffman |
| 8,246,439 B2 | 8/2012 | Kelly |
| 8,272,934 B2 | 9/2012 | Olive |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,584 B2 | 11/2012 | Aoki |
| 8,317,601 B1 | 11/2012 | Luciano, Jr. |
| 8,323,110 B2 | 12/2012 | Shibamiya |
| 8,328,642 B2 | 12/2012 | Mosites |
| 8,332,260 B1 | 12/2012 | Mysen |
| 8,332,544 B1 | 12/2012 | Ralls |
| 8,348,716 B2 | 1/2013 | Ganz |
| 8,348,762 B2 | 1/2013 | Willis |
| 8,348,767 B2 | 1/2013 | Mahajan |
| 8,348,768 B2 | 1/2013 | Auterio |
| 8,360,858 B2 | 1/2013 | LaRocca |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Herrmann |
| 8,371,925 B2 | 2/2013 | Bonney |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett |
| 8,439,759 B1 | 5/2013 | Mello |
| 8,475,262 B2 | 7/2013 | Wolf |
| 8,506,394 B2 | 8/2013 | Kelly |
| 8,512,150 B2 | 8/2013 | Herrmann |
| 8,583,266 B2 | 11/2013 | Herbrich |
| 8,636,591 B1 | 1/2014 | Hawk |
| 8,777,754 B1 | 7/2014 | Santini |
| 8,784,214 B2 | 7/2014 | Parks |
| 8,790,185 B1 | 7/2014 | Caldarone |
| 8,831,758 B1 | 9/2014 | Chu |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,138,639 B1 | 9/2015 | Ernst |
| 9,257,007 B2 | 2/2016 | Santini |
| 2002/0059397 A1 | 5/2002 | Feola |
| 2002/0072412 A1 | 6/2002 | Young |
| 2002/0094863 A1 | 7/2002 | Klayh |
| 2002/0095327 A1 | 7/2002 | Zumel |
| 2002/0115488 A1 | 8/2002 | Berry |
| 2002/0119824 A1 | 8/2002 | Allen |
| 2002/0165794 A1 | 11/2002 | Ishihara |
| 2002/0183105 A1 | 12/2002 | Cannon |
| 2002/0193162 A1 | 12/2002 | Walker |
| 2003/0008713 A1 | 1/2003 | Ushiro |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0190960 A1 | 10/2003 | Jokipii |
| 2003/0216167 A1 | 11/2003 | Gauselmann |
| 2004/0002387 A1 | 1/2004 | Grady |
| 2004/0068451 A1 | 4/2004 | Lenk |
| 2004/0215524 A1 | 10/2004 | Parkyn |
| 2004/0224745 A1 | 11/2004 | Bregenzer |
| 2004/0225387 A1 | 11/2004 | Smith |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Zack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0063587 A1 | 3/2006 | Manzo |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |
| 2006/0287029 A1 | 12/2006 | Yoshinobu |
| 2006/0287102 A1 | 12/2006 | White |
| 2007/0021213 A1 | 1/2007 | Foe |
| 2007/0077988 A1 | 4/2007 | Friedman |
| 2007/0111770 A1 | 5/2007 | Van Luchene |
| 2007/0129139 A1 | 6/2007 | Nguyen |
| 2007/0129147 A1 | 6/2007 | Gagner |
| 2007/0191101 A1 | 8/2007 | Coliz |
| 2007/0191102 A1 | 8/2007 | Coliz |
| 2007/0213116 A1 | 9/2007 | Crawford |
| 2007/0281285 A1 | 12/2007 | Jayaweera |
| 2008/0032787 A1 | 2/2008 | Low |
| 2008/0058092 A1 | 3/2008 | Schwartz |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0194318 A1 | 8/2008 | Kralicky |
| 2008/0200260 A1 | 8/2008 | Deng |
| 2008/0207306 A1 | 8/2008 | Higbie |

(56) References Cited

U.S. PATENT DOCUMENTS

| | | |
|---|---|---|
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0124353 A1 | 5/2009 | Collette |
| 2009/0204907 A1 | 8/2009 | Finn |
| 2009/0210301 A1 | 8/2009 | Porter |
| 2009/0234710 A1 | 9/2009 | Belgaied Hassine |
| 2009/0315893 A1 | 12/2009 | Smith |
| 2010/0022307 A1 | 1/2010 | Steuer |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0218033 A1 | 9/2011 | Englman |
| 2011/0227919 A1 | 9/2011 | Bongio |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0083909 A1 | 4/2012 | Carpenter |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0309504 A1 | 12/2012 | Isozaki |
| 2012/0311504 A1 | 12/2012 | vanOs |
| 2012/0322545 A1 | 12/2012 | Arnone |
| 2012/0322561 A1 | 12/2012 | Kohlhoff |
| 2012/0330785 A1 | 12/2012 | Hamick |
| 2013/0005437 A1 | 1/2013 | Bethke |
| 2013/0005466 A1 | 1/2013 | Mahajan |
| 2013/0005473 A1 | 1/2013 | Bethke |
| 2013/0005475 A1 | 1/2013 | Mahajan |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013459 A1 | 1/2013 | Kerr |
| 2013/0029745 A1 | 1/2013 | Kelly |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217489 A1 | 8/2013 | Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0288757 A1 | 10/2013 | Guthridge |
| 2013/0290147 A1 | 10/2013 | Chandra |
| 2013/0303726 A1 | 11/2013 | Mozzarelli |
| 2013/0310164 A1 | 11/2013 | Walker |
| 2013/0344932 A1 | 12/2013 | Adams |
| 2014/0004884 A1 | 1/2014 | Chang |
| 2014/0018156 A1 | 1/2014 | Rizzotti |
| 2014/0033262 A1 | 1/2014 | Anders |
| 2014/0038679 A1 | 2/2014 | Snow |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0128137 A1 | 5/2014 | Balise |
| 2014/0157314 A1 | 6/2014 | Roberts |
| 2014/0206452 A1 | 7/2014 | Bambino |
| 2014/0243072 A1 | 8/2014 | Santini |
| 2014/0274359 A1 | 9/2014 | Helava |
| 2014/0295958 A1 | 10/2014 | Shono |

(56) References Cited

U.S. PATENT DOCUMENTS

| | | | |
|---|---|---|---|
| 2014/0329585 A1 | 11/2014 | Santini |
| 2014/0337259 A1 | 11/2014 | Lamb |
| 2015/0019349 A1 | 1/2015 | Milley |
| 2015/0031440 A1 | 1/2015 | Desanti |
| 2015/0306494 A1 | 10/2015 | Pieron |
| 2015/0335995 A1 | 11/2015 | McLellan |
| 2015/0352436 A1 | 12/2015 | Pieron |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

Profession—WoWWiki—Your guide to the World of Warcraft, URL: http://www.wowwiki.com/Profession, printed Nov. 6, 2012, 8 pages.

"Digital River World Payments and Lotaris Partner to Extend Mobile Application Licensing and Monetization Capabilities to Software Publishers", Business Wire Press Release, http://www.market watch.com/ story/ digital- river-world- payments-and-lotaris . . . , posted San Francisco, Mar. 27, 2012 (Business Wire), 8:30 a.m. EDT, printed May 24, 2012 2:32 PM, 3 pages.

"Behavioural Analytics & Campaigning", http://lotaris.com/behavioural._analytics_and._Campaigning.htm, screenshot access date May 24, 2012 2:21 PM, 1 page.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Clash of Clans". Wikipedia.org. Online. Accessed via the Internet. Accessed Aug. 9, 2014. <URL: http://en.wikipedia.org/wiki/Clash of Clans>, 3 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_—_Part_2& oldid=399366, http://lotro-wiki.com/index.php?title=Getting_Started&oldid=349681, Links are to used articles, 33 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Building Structures". War2.warcraft.org. Online. Accessed via the Internet. Accessed Aug. 9, 2014. <URL: http://war2.warcraft.org/strategy/verybasics/building.shtml>, 3 pages.

City Coins. CityVille Wikia. Online. Accessed via the Internet. Accessed Aug. 9, 2014. <URL: http://cityville.wikia.com/wiki/City_Coins>, 2 pages.

Gaia "Black Friday Bundle" available on Nov. 23, 2011, from http://www.gaiaonline.com/forum/community-announcements/black-friday-big-bundles-rare-items/t.76127933/, 5 pages.

UBC, "Theory of Auctions" available on Mar. 24, 2012 from https://web.archive.org/web/20120324204610/http://montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

TFWiki "teamfortress wiki" available Nov. 5, 2011 retrieved from https://web.archive.org/web/20111105044256/http://wiki.teamfortress.com/wiki/Loadout, 4 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

Super Mario Bros. 3 Review, Nintendo for NES, Feb. 1990, pp. 1-4.

Super Mario Bros. 3, NES Gameplay, http://www.youtube.com/watch?v=82TL-Acm4ts, 1 page.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Rest—WoWWiki—Your guide to the World of Warcraft", printed from http://www.wowwiki.com/Rest, May 19, 2014, 2 pages.

Quest item—WoWWiki—Your guide to the World of Warcraft, printed from http://www.wowwiki.com/Quest_item, Retrieved on Apr. 16, 2014, 1 page.

"Cataclysm Guide: Guild Advancement—Wowhead", http://www.wowhead.com/guide=cataclysm&guilds, printed Dec. 5, 2013, 4 pages.

TFF Challenge—UC Davis, http://tffchallenge.com/team/uc-davis/, printed Jan. 15, 2014, 12 pages.

"Guild Housing System—FlyFF Wiki", http://flyff-wiki.gpotato.com/wiki/Guild_Housing_System, printed Dec. 5, 2013, 5 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

Diablo 2, Blizzard Entertainment, Mar. 23, 2009, manual and online website, http://web.archive.Org/web/20090323171356/http://classic.battle.net/diablo 2exp/items/basics.shtml, 51 pages.

Path of Exile, Internet posting: http://web.archive.org/web/20120606004658/http://www.pathofexile.com/forum/view-thread/12056, Nov. 16, 2011, 52 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

MapleStory—Guides—Equipment Upgrading 101: Potentials, URL: maplestory.nexon.net/guides/game-play/systems/OOFIj/ [Retrieved Jun. 24, 2013], 5 pages.

Dreamslayer's Enchanting and Upgrading Guide—With Pictures:D and Explanations, URL: forums.elswordonline.com/Topic5673.aspx [Retrieved Feb. 21, 2013], 10 pages.

The Arreat Summit—Items: Basic Item Information, URL: web.archive.org/web/20090323171356/http://classic.battle.net/diablo2exp/items/basics.shtml [Retrieved Feb. 21, 2013], 3 pages.

Elsword—Wikipedia, the free encyclopedia, URL: en.wikipedia.org/wiki/Elsword [Retrieved Feb. 21, 2013], 6 pages.

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.

Super Mario Bros. 3, StrategyWiki, the video game walkthrough and strategy guide, http://strategywiki.org/wiki/Super_Mario_Bros._3, 4 pages.

MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

(56) References Cited

OTHER PUBLICATIONS

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

MapleStory—Guides—Equipment Upgrading 101: Enhancements, URL: maplestory.nexon.net/guides/game-play/systems/OOFlk; [Retrieved Jun. 24, 2013] 3 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_—_Part_2&oldid=399366>, <http://lotrowiki.com/index.php ?title=Getting_Started&oldid=349681 >. Links are to used articles. (7 pgs) Feb. 26, 2014.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).

"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.

New Feature: Tiered Tournaments and Tournament Updates, printed from http://community.kabam.com/forums/showthread.php?171349-New-Feat on Feb. 11, 2014, 2 pages.

Wikipedia, Mafia Wars, <http://en.wikipedia.org/wiki/Mafia_Wars>, Jan. 28, 2012, 3 pages.

SYSTEM AND METHOD FOR PROVIDING VIRTUAL ITEMS TO USERS OF A VIRTUAL SPACE

FIELD OF THE DISCLOSURE

This disclosure relates to providing virtual items to users of a virtual space, and in particular providing virtual items to users of a virtual space, wherein the users of the virtual space have a relationship with one another.

BACKGROUND

The popularity of online games has grown over the years. Conventional online games are provided through gaming platforms, such as Facebook.com, Kabam.com, Zynga.com, Bigpoint Games, Steam, etc. Within the online games and/or gaming platforms, gaming communities have developed to promote group-based game play. The gaming communities may be known as affiliations. The affiliations facilitate online game play to perform tasks within the online game, facilitate actions within the online game amongst members of the affiliation, and facilitate actions to compete against other affiliations.

Membership with an affiliation may impact retention of users within the online game. That is, users of an online game that are members of an affiliation may be more likely to spend more time and resources within an online game. Conventional affiliations within online games may be all-inclusive, accepting all users that desire membership to the affiliation, while other affiliations within an online game may be extremely exclusive. Certain affiliations grant memberships to new users based on a need for additional members or based on in-game performance metrics of users. As such, affiliations may become cliques, where membership to an affiliation is hard or impossible for new users to obtain. Additionally, joining an affiliation may seem like a daunting task to new users.

Accordingly, alternative approaches including incentives for users that are members of an affiliation may encourage affiliations to accept new members and/or encourage current members of the affiliation to remain active and/or increase their activity in the online game.

SUMMARY

One aspect of the disclosure relates to a system that provides virtual items to users of a virtual space. The system may provide virtual items to users having an affiliation in the virtual space, such that the virtual items are provided to one or more of the affiliation members. The affiliation virtual item or affiliation unit may provide a benefit to the members of the affiliation. The benefit may be provided to each member individually, or the benefit may be provided to the members collectively. When the benefit is provided to the members collectively, the benefit may be realized when the members of the affiliation are acting for a common goal or purpose. The affiliation units may be provided to members of the affiliation in response to the members providing virtual items in exchange for the affiliation units. The affiliation units may provide a benefit having a benefit level that is proportional to the number of users of an affiliation that have contributed virtual items. The affiliation units may be distributed to the members of the affiliation after a threshold number of users have provided virtual items.

In implementations, a system may include one or more physical computer processors configured by machine readable instructions to perform one or more functions. The machine readable instructions may be thought of conceptually as components of the machine readable instructions. However, this application includes all forms of machine readable instructions whether provided in component form or otherwise. Such components may include a space component, a user component, a relationship component, a virtual item component, an offer component, a distribution component, a notification component, and one or more other components.

The space component may facilitate participation by multiple users in an online game through client computing platforms associated with the users. The space component may be configured to execute an instance of the online game to facilitate presentation of the online game to the users. The game module may be configured to implement in-game actions in the instance of the online game in response to actions requests for the in-game actions from the users. The space component may be configured to facilitate user participation in the online game by effectuating transmission of information related to the instance of the online game to client computing platforms on which views of the online game are presented to users. The users may include a first user and a second user.

The relationship component may be configured to manage one or more affiliations within the online game. A given affiliation within the online game may comprise a discrete group of users with a relationship having a functional significance within the online game. The relationship having a functional significance in the online game may impact on-game play for the users. The affiliations may comprise a first affiliation within a first online game between a group of users including the first user and the second user. The relationship having a functional significance may include one or more of a leadership role, a controller role, a mentorship role, and/or an administrator role.

The virtual item component may be configured to provide affiliation game units associated with affiliations within the online game. The affiliation game units may be, for example, game characters, realms associated with the affiliation, buildings providing a benefit to users, weapons associated with the affiliation, vehicles associated with the affiliation, symbolic virtual items associated with the affiliation, and/or other virtual items. The affiliation game units may be controllable in the online game by individual ones of the users in the affiliations with which they are associated. The affiliation game units may include a first affiliation game unit associated with the first affiliation.

The affiliation game units may include one or more benefit metrics, wherein the benefit metrics indicate a benefit received by the affiliation members from the affiliation game unit. The benefit metrics may reflect increased stamina, cohesion, effectiveness, brutality, speed, power, and/or other parameters for users' armed forces within the game. The benefit metrics may reflect increased production, yield, effectiveness, multiplication, and/or other parameters for users' resources within the online game. The benefit metrics may reflect a benefit over other members of different affiliations. The benefit metrics may reflect increased responsiveness of the virtual space environment to users of the affiliation. The benefit metrics may reflect availability of game elements, such as quests, missions, map areas, and/or other game elements within the virtual space. The benefit metrics may reflect a multiplier for users of an affiliation when users are purchasing virtual currency to use in the virtual space. The benefit metrics may reflect a discount for in-game items for users of the affiliation.

The benefit metrics may comprise level values, indicating a level of the benefit indicated by the benefit metric. For example, the higher the level value of a benefit metric, the more benefit is provided to the users of the affiliation. The virtual item component may be configured to increase a level value of one or more benefit metrics of the affiliation game units. The virtual item component may increase the level value of the one or more benefit metrics in response to the users in the affiliations providing one or more virtual items. For example, a first level value of a first benefit metric of the first affiliation game unit may be increased in response to the first user providing one or more virtual items. The first level value of a first benefit metric of the first affiliation game unit may be increased in response to the first user and the second user providing one or more virtual items.

The amount of increase of the level value of the one or more benefit metrics may be based on the amount of users having the given affiliation that provide one or more virtual items to upgrade the affiliation game unit. The amount of increase of the level value of the one or more benefit metrics of the affiliation game item may be based on the proportion of users having a given affiliation that have provided one or more virtual items to upgrade the affiliation game unit. The amount of increase of the level value of the one or more benefit metrics of the affiliation game item may be based on the number of users having a given affiliation that have provided one or more virtual items to upgrade the affiliation game unit, exceeding one or more thresholds. The amount of increase of the level value of the one or more benefit metrics of the affiliation game item may be based on the cumulative value of the virtual items provided by the users having a given affiliation to upgrade the affiliation game unit.

The one or more benefit metrics of the one or more affiliation game units may have one or more discrete benefit level values and the virtual item components may be configured to promote the one or more benefit metrics from a first benefit level value to a second benefit level value in response to a threshold amount of the users having a given affiliation providing a threshold amount of one or more virtual items to promote the one or more affiliation character units. The one or more benefit metrics of the given affiliation may include one or more of a defense metric, an attack metric, a skill metric, a loyalty metric, a moral metric, an energy metric, and/or a speed metric. The one or more benefit metrics of the given affiliation may include one or more of a resource metric and/or a production attack metric.

The affiliation game unit may be a game unit which, when used by a member of the affiliation, may provide a benefit to the user. For example, if the affiliation game unit is a military general, use of the affiliation game unit being a military general may provide a benefit to the member in battles against other users. Other users, against which the affiliation game unit is used, may be users not being part of the affiliation.

The affiliation game unit may provide a benefit when the users are engaged in individual endeavors. The affiliation game unit may provide a benefit when the users are engaged in affiliation-based endeavors. Individual ones of the affiliation game units may be provided to the individual members of the affiliation when awarded to the affiliation members. One affiliation game unit may be awarded to the affiliation members providing a benefit to the affiliation individually and/or as a whole.

The affiliation game unit may be controllable by users of the affiliation within the online game. For example, both the first user and the second user may control the affiliation game unit by virtue of their inclusion in the first affiliation. The affiliation game unit may be controllable by individual ones of the discrete group of users. The affiliation game unit may be controllable by only one of the individual ones of the discrete group of users during any given time period. In other implementations, the affiliation game unit may be controllable my multiple ones of the discrete group of users during any given time period. The individual ones of the discrete group of users in the given affiliation that are able to control the one or more affiliation game units may have a relationship having a functional significance with the other users of the discrete group of users in the given affiliation. The individual ones of the discrete group of users in the given affiliation able to control a given affiliation game unit may include users having an indication of a priority for controlling the given affiliation game unit.

The affiliation game unit may not be controllable by the members of the affiliation and instead may be provided to the members of the affiliation and the members of the affiliation may receive a benefit by virtue of the affiliation game unit being provided to them. The affiliation game unit may be upgraded such that users may provide additional virtual items to increase the level values of the benefit metrics and/or provide additional virtual items to increase the number and/or type of the benefit metrics.

The perceived value of the virtual items required of the users to upgrade the affiliation game unit may increase as the perceived benefit of the level value of the benefit metrics and/or the perceived benefit of the benefit metrics increase.

The offer component may be configured to effectuate presentation of offers to the users having a given affiliation. The offers may include a notification to the user having a given affiliation to provide one or more virtual items to increase a benefit level and/or the benefit type of the one or more benefit metrics of a given affiliation unit associated with the affiliation. For example, a first offer may be provided to the users of the first affiliation to provide one or more virtual items in exchange for increasing the first benefit level of the first benefit metric of the first affiliation unit associated with the first affiliation.

The offer component may be configured to effectuate presentation of offers to the users having a given affiliation to purchase one or more virtual items for increasing a benefit level and/or benefit type of the one or more benefit metrics of the given affiliation game character associated with the given affiliation.

The offers may also include offers to upgrade the affiliation virtual units, such that the offer component may be configured to provide offers to increase the level values of benefit metrics and/or modify the benefit metric type provided by a given affiliation game unit.

The virtual items requested from the users in exchange for the affiliation game units may include one or more of resources obtained in the virtual space, attacking troop units, defensive troop units, virtual items obtained in the virtual space, virtual items purchased from a game shop, and/or virtual currency. Virtual currency may take any form, such as coins, experience points, gems, precious stones, precious metals, game items, game units, virtual realms, virtual buildings, and/or other virtual items having a perceived value in the virtual space and/or online game.

The distribution component may be configured to provide the affiliation game units in response to the users having a given affiliation accepting the offer. The distribution component may be configured to provide the affiliation game unit upon the occurrence of one or more of the events described above with respect to the number, amount, threshold, or other measurement of users accepting the offer. For example, the distribution component may be configured to provide the affiliation game unit to one or more members having a given affiliation in response to the number of users accepting the offer exceeding a threshold number of user, exceeding an obtained number of users, or exceeding an obtained percentage of users of the affiliation accepting the offer.

The notification component may be configured to provide notifications to users of the affiliation indicating the offer for the affiliation game unit. The notification component may be configured to provide notifications top the members of a given affiliation giving an indication of the number, percentage, and/or proportion of users in a given affiliation that have accepted the offer. The notification component may provide messages to users providing encouragement to accept the offer. The notification component may facilitate identifying, to affiliation members, those users who have accepted the offer and/or those users who have not accepted the offer. The notification component may provide notifications giving an indication of how close to an acceptance threshold the members of the affiliation are at. Where the offer includes an offer for affiliation members to provide an accumulative amount of virtual currency and/or virtual items in exchange for being provided an affiliation game unit, the notification component may provide a notification giving an indication of the amount of virtual currency and/or virtual items collectively provided by the affiliation members and/or how much virtual currency and/or virtual items are required from the affiliation members to receive the affiliation game unit, and/or upgrade the affiliation game unit.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
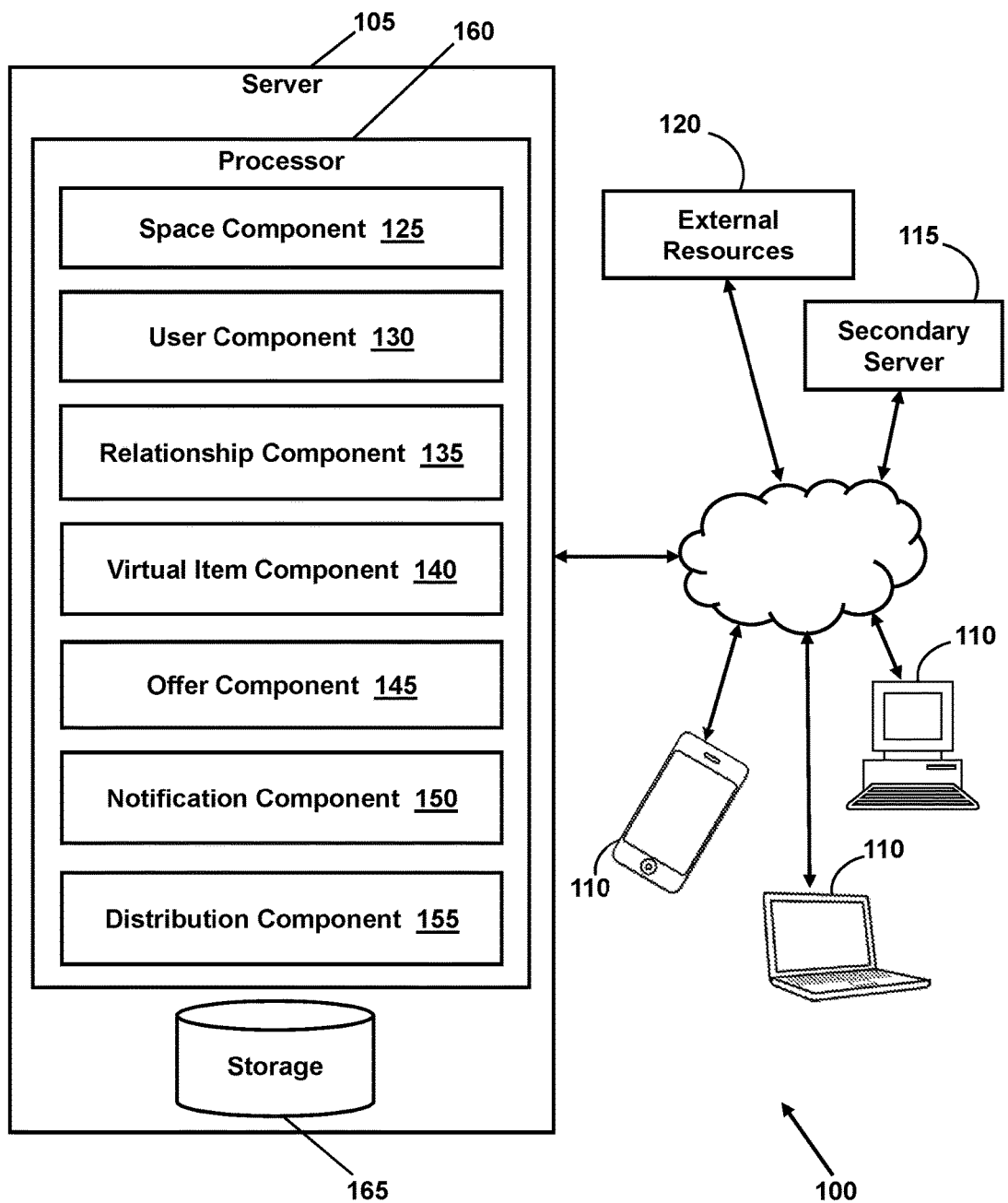
FIG. 1 illustrates a system for providing virtual items to users of a virtual space, in accordance with one or more implementations.

FIG. 1 illustrates a system 100 for providing virtual items to users of a virtual space, in accordance with one or more implementations. Providing the virtual space may include hosting the virtual space over a network. In some implementations, system 100 may include a server 105. The server 105 may be configured to communicate with one or more client computing platforms 110 according to a client/server architecture. The users may access system 100 and/or the virtual space via client computing platforms 110. In some implementations, the system may include secondary servers 115 configured to provide one or more additional functionalities to system 100. The secondary servers 115 may be configured to communicate with server(s) 105, client computing platforms 110, and/or other elements. The secondary server(s) 115 may be configured to interface with server 105 to supplement the functionality provided to the users with respect to the virtual space. For example, secondary server(s) 115 may interface with server 105 via one or more application programming interfaces.

The server 105 may include one or more computer processors 160 configured by machine-readable instructions to perform one or more functions. The machine-readable instructions may be thought of conceptually as components of the machine-readable instructions. However, this application includes all forms of machine-readable instructions, whether provided in component form or otherwise. The server 105 may be configured to execute one or more computer program components. The computer program components may include one or more of a space component 125, a user component 130, a relationship component 135, a virtual item component 140, an offer component 145, a distribution component 155, a notification component 150, and/or other components.

The space component 125 may facilitate participation by multiple users in an online game through client computing platforms associated with the users. The space component 125 may be configured to execute an instance of the online game to facilitate presentation of the online game to the users. The game module may be configured to implement in-game actions in the instance of the online game in response to actions requests for the in-game actions from the users. The space component 125 may be configured to facilitate user participation in the online game by effectuating transmission of information related to the instance of the online game to client computing platforms on which views of the online game are presented to users. The users may include a first user and a second user.

The space component 125 may be configured to implement the instance of the virtual space executed by the computer components to determine the state of the virtual space. The state may then be communicated (e.g., via streaming visual data, via object/position data, and/or other state information) from server 105 to client computing platforms 110 for presentation to users. The state determined and transmitted to a given client computing platform 110 may correspond to a view for a user character being controlled by a user via the given client computing platform 110. The state determined and transmitted to a given client computing platform 110 may correspond to a location in the virtual space. The view described by the state for the given client computing platform may correspond, for example, to the location from which the view is taken, the location the view depicts and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 110) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which state of the virtual space is determined by space component 125 is not intended to be limiting. The space component 125 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 125, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency that the user can use (e.g., by manipulation of a user character or other user-controlled element, and/or other items) within the virtual space.

The users may participate in the instance of the virtual space by controlling one or more of the available user-controlled elements in the virtual space. Control may be exercised through control inputs and/or commands input by the users through client computing platforms 110. The users may interact with each other through communications exchanged within the virtual space. Such communications may include one or more of textual chat, instant messages, private messages, voice communications, and/or other communications. Communications may be received and entered by the users via their respective client computing platforms 110. Communications may be routed to and from the appropriate users through server 105 (e.g., through space component 125).

The instance of the virtual space and/or the game that takes place therein may be persistent. That is, the virtual space and/or the game may continue on whether or not individual players are currently logged in and/or participating in the game. A player that logs out of the virtual space and then logs back in some time later may find that the virtual space has been changed through the interactions of other players with the virtual space during the time the player was logged out. These changes may include changes to the simulated physical space, changes in the player's inventory, changes in other player's inventories, changes experienced by non-player characters, and/or other changes.

Interactive electronic social media may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive electronic social media may include the micro-blogging service provided by Twitter™, the social network provided by Facebook™, the social network provided by MySpace™, the social network provided by Foursquare®, the virtual world provided by Second Life®, the massively multi-player online game provided by World of Warcraft®, the file sharing service provided by Flickr®, Blogger, YouTube, PlayStation® Home, Xbox® Live, and/or other interactive electronic social media.

The user component 130 may be configured to access and/or manage one or more user profiles and/or user information associated with users of the system 100. The one or more user profiles and/or user information may include information stored by server 105, one or more of the client computing platforms 110, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The relationship component 135 may be configured to establish relationships between users within the virtual space. Such relationships may include one or more of affiliation, friendships, guilds (with guild-mates), alliances, connections, followers, comrades, teams, cooperatives, and/ or other relationships. The relationship component 135 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships that a social construct within the virtual space does not have a functional result.

The relationship component 135 may be configured to manage one or more affiliations within the online game. A given affiliation within the online game may comprise a discrete group of users with a relationship having a functional significance within the online game. The relationship having a functional significance in the online game may impact in-game play for the users. The affiliations may comprise a first affiliation within a first online game between a group of users including the first user and the second user. The relationship having a functional significance may include one or more of a leadership role, a controller role, a mentorship role, and/or an administrator role.

The system may further comprise an interaction component. The interaction component may be configured to monitor interactions of the users with the virtual space and/or each other within the virtual space. This may include monitoring, for a given user, one or more of times at which the given user is logged in to the virtual space; areas of the virtual space the given user views or interacts with or in; other users the given user interacts with; the nature and/or content of interactions of the given user with other users; activities participated in within the virtual space; level, powers, or skill attained in the virtual space; inventory items obtained in the virtual space; and/or other interactions of the given user with the virtual space and/or other users. Some or all of the information generated by the interaction component in monitoring the interactions of the users may be stored to the user profiles managed by user component 130.

At a given time, the interaction component may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or taking some other action indicating ongoing and contemporaneous engagement with the virtual space.

The interaction component may be configured to determine, for individual users, an activity metric that indicates an activity level within the virtual space. The activity metric may be determined based on one or more of log-in frequency, amount of time logged in to the virtual space within a rolling time period (e.g., over the last day, week, month, or other rolling time period), average amount of time logged in to the virtual space over some length of time (e.g., per day, per week, and/or other length of time), average log-in session time over a rolling time period, number of inter-user communications over a length of time, number of inter-user communications per log-in, number of relationships with other users in the virtual space, number of new relationships with other users in the virtual space within a rolling time period, amount of real world money spent in the virtual space, and/or other activity parameters.

The virtual item component 140 may be configured to provide affiliation game units associated with affiliations within the online game. The affiliation game units may be, for example, game characters, realms associated with the affiliation, buildings providing a benefit to users, weapons associated with the affiliation, vehicles associated with the affiliation, symbolic virtual items associated with the affiliation, and/or other virtual items. The affiliation game units may be controllable in the online game by individual ones of the users in the affiliations with which they are associated. The affiliation game units may include a first affiliation game unit associated with the first affiliation.

Figure 2:
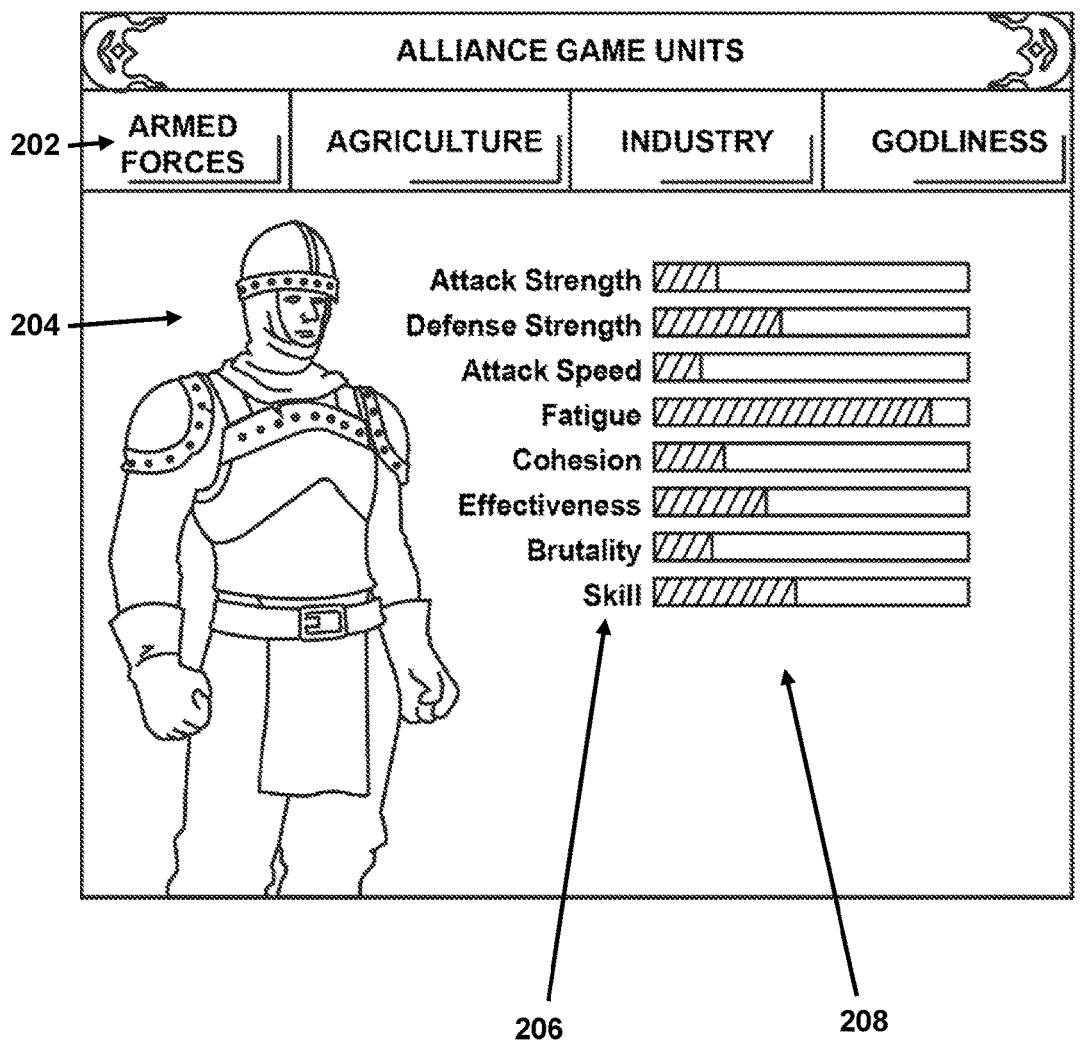
FIG. 2 illustrates an interface for providing views of affiliation game units associated with a user's affiliation, in accordance with one or more implementations.

Referring to FIG. 2, disclosed is an affiliation game unit interface 200. The affiliation game unit interface 200 may be configured to effectuate presentation of information about the affiliation game units available to members of the affiliation. The affiliation game unit interface 200 may include a number of tabs 202 associated with different aspects of the virtual space. For example, in a game operated in the virtual space, the game may include activities and virtual items associated with attacking, or defending against attack from, other users' game characters, realms, and/or virtual items. The game may include activities and virtual items associated with attacking, or defending against attack from non-player characters, realms, and/or virtual items. The game may include activities associated with growing resources, making resources, and/or developing industries, generating resources, and/or other activities. There may be any number of tabs 202 associated with any number of aspects of the virtual space. A user associated with an affiliation may access the affiliation game unit interface 200 to view the attributes and/or benefits of the affiliation game unit for the game activity. There may be multiple affiliation game units for each category type, or sub-category type, of activity experienced by users in an online game conducted in a virtual space.

An affiliation game unit may be associated with a user's attacking and/or defensive actions, such an affiliation game unit may be a military type affiliation game unit 204. The military affiliation game unit 204 may take an appearance associated with military activities, such as a knight, soldier, general, sailor, admiral, and/or other appearances. The appearance of the affiliation game unit 204 may be based on a faction, affiliation, race, and/or other characteristics of a user's game character.

The affiliation game units 204 may include one or more benefit metrics 206, wherein the benefit metrics indicate a benefit received by the affiliation members from the affiliation game unit 204. The benefit metrics 206 may relate to the activity associated with the affiliation game unit 204. For example, the benefit metrics 206 of the military affiliation game unit 204 may be associated with military-type actions. Such military-type benefit metrics 206 may include attack strength, defense strength, attack speed, fatigue, cohesion, effectiveness, brutality, skill, and/or other military-type benefit metrics. The benefit metrics 206 may have associated level values. The benefit metrics 206 may comprise level values, indicating a level of the benefit indicated by the benefit metric. For example, the higher the level value of a benefit metric, the more benefit is provided to the users of the affiliation. The level values associated with the benefit metrics 206 may be presented in the affiliation game unit interface 200 by level value bars 208 associated with each level, the more benefit is provided to the users of the affiliation.

In some implementations, there may be multiple level values for the benefit metrics of an affiliation game unit. One method contemplated for upgrading affiliation game units, by affiliation members, is to permit the affiliation members, individually or collectively, to increase the benefits provided by the affiliation game units. The benefits may be increased individually, such that for an affiliation game unit that provides multiple benefits to the users of the affiliation, the value level of each benefit metric of the affiliation game unity may be increased independently of all other benefit metrics.

In some implementations, the graphical bars 208 may provide an indication of how close the affiliation members are to obtaining the next level value of each benefit metric provided by the affiliation game unit. In the example, shown in FIG. 2, the alliance members may be much closer to obtaining the next level value for the fatigue benefit metric, compared to the brutality level metric. In other implementations, the graphical bars 208 may represent the level value of the benefit metrics. In such implementations, the graphical bar associated with the fatigue benefit metric may move further to the left as the affiliation game unit 204 is upgraded, whereas the graphical bars associated with the other benefit metrics may move further to the right when the affiliation game unit 204 is upgraded.

The types of benefit metrics provided by the affiliation game units are not limited to the disclosure herein, nor to those disclosed in the Figures. Affiliation game units may provide benefits to members of an alliance with which the affiliation game units are associated for any manner of activities, events, and/or actions within the virtual space. In some implementations, the benefit metrics may reflect, but not be limited to, increased stamina, cohesion, effectiveness, brutality, speed, power, and/or other parameters for users' armed forces within the game. The benefit metrics may reflect, but not be limited to, increased production, yield, effectiveness, multiplication, and/or other parameters for users' resources within the online game. The benefit metrics may reflect, but not be limited to, a benefit over other members of different affiliations. The benefit metrics may reflect increased responsiveness of the virtual space environment to users of the affiliation. The benefit metrics may reflect, but not be limited to, availability of game elements, such as quests, missions, map areas, and/or other game elements within the virtual space. The benefit metrics may reflect, but not be limited to, a multiplier for users of an affiliation when users are purchasing virtual currency to use in the virtual space. The benefit metrics may reflect, but not be limited to, a discount when purchasing in-game items by users of the affiliation.

The offer component 145 may be configured to effectuate presentation of offers to the users having a given affiliation for affiliation game units. The offers may include a first offer of a first affiliation game unit. The offers may include a user cost associated with the offer, such that the first offer is for a first affiliation game unit in exchange for a first associated user cost. The offers may include a notification to the user having a given affiliation to provide one or more virtual items to increase a benefit level and/or the benefit type of the one or more benefit metrics of a given affiliation game unit associated with the affiliation. For example, a first offer may be provided to the users of the first affiliation to provide one or more virtual items in exchange for increasing the first benefit level of the first benefit metric of the first affiliation unit associated with the first affiliation.

The affiliation game unit may be a game unit which, when used by a member of the affiliation, may provide a benefit to the user. For example, if the affiliation game unit is a military general, use of the affiliation game unit being a military general may provide a benefit to the member in battles against other users. Other users, against which the affiliation game unit is used, may be users not being part of the affiliation.

The affiliation game unit may provide a benefit when the users are engaged in individual endeavors. The affiliation game unit may provide a benefit when the users are engaged in affiliation-based endeavors. Individual ones of the affiliation game units may be provided to the individual members of the affiliation when awarded to the affiliation members. One affiliation game unit may be awarded to the affiliation members providing a benefit to the affiliation individually and/or as a whole.

The affiliation game unit may be controllable by users of the affiliation within the online game. For example, both the first user and the second user may control the affiliation game unit by virtue of their inclusion in the first affiliation. The affiliation unit may be controllable by individual ones of the discrete group of users. The individual ones of the discrete group of users in the given affiliation that are able to control the one or more affiliation game units may have a relationship having a functional significance with the other users of the discrete group of users in the given affiliation. The individual ones of the discrete group of users in the given affiliation able to control a given affiliation game unit may include users having an indication of a priority for controlling the given affiliation game unit.

The affiliation game unit may not be controllable by the members of the affiliation and instead may be provided to the members of the affiliation, and the members of the affiliation may receive a benefit by virtue of the affiliation game unit being provided to them. The affiliation game unit may be upgraded such that users may provide additional virtual items to increase the level values of the benefit metrics, and/or provide additional virtual items to increase the number and/or type of the benefit metrics.

The offer component 145 may be configured to effectuate presentation of offers to the users having a given affiliation to purchase one or more virtual items for increasing a benefit level and/or benefit type of the one or more benefit metrics of the given affiliation game character associated with the given affiliation. The notification component may be configured to provide notifications to users of the affiliation indicating the offer for the affiliation game unit. The notification component may be configured to provide notifications to the members of a given affiliation giving an indication of the number, percentage, and/or proportion of users in a given affiliation that have accepted the offer. The notification component may provide messages to users providing encouragement to accept the offer. The notification component 150 may facilitate identifying, to affiliation members, those users who have accepted the offer and/or those users who have not accepted the offer. The notification component may provide notifications giving an indication of how close the members of the affiliation are to an acceptance threshold. Where the offer includes an offer for affiliation members to provide an accumulative amount of virtual currency and/or virtual items in exchange for being provided an affiliation game unit, the notification component may provide a notification giving an indication of the amount of virtual currency and/or virtual items collectively provided by the affiliation members and/or how much virtual currency and/or virtual items are required from the affiliation members to receive the affiliation game unit, and/or upgrade the affiliation game unit.

Figure 3:
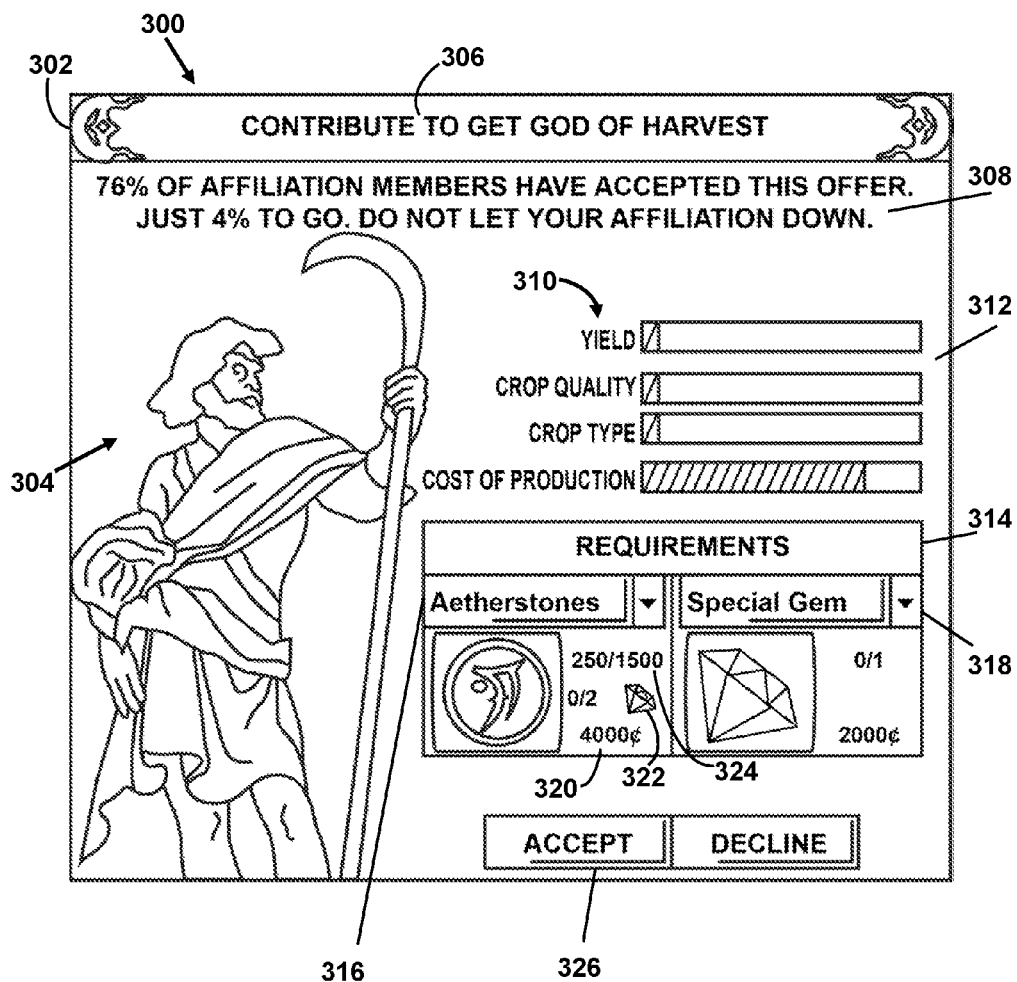
FIG. 3 illustrates an interface for providing offers to users having an affiliation for affiliation game units, in accordance with one or more implementations.

Referring to FIG. 3, illustrated is an interface 300 for providing offers 302 to users having an affiliation for affiliation game units, in accordance with one or more implementations. The offer 302 may be to obtain an affiliation game unit 304 for the users having an associated affiliation.

The interface 300 may be configured to effectuate presentation of the offer 302 to users through associated client computing platforms 110 (as shown in FIG. 1). The interface 300 may present a title 306 and/or notification to the users providing an indication of the identity of the affiliation game unit 304 that will be obtained by enough users of the affiliation accepting the offer 302. The interface 300 may facilitate presentation of a progress notification 308, providing an indication of the number and/or amount of users of the affiliation who have so far accepted the offer 302. The interface 300 may facilitate presentation of a notification 308, providing an indication of the number and/or amount of users of the affiliation required to accept the offer before the users associated with the affiliation will be provided with the affiliation game unit 304.

The interface 300 may provide an indication of one or more benefit metrics 310 associated with the offered affiliation game unit 304. The one or more benefit metrics 310 may be associated with benefits provided to the users having an affiliation once the users accept the offer 302. The interface 300 may effectuate presentation of level values 312 of the benefit metrics 310 associated with the affiliation game unit 304. The interface 300 may effectuate presentation of an indication to the users of the associated user cost 314 that the user having the affiliation must provide to accept the offer 302. In some implementations, the first offer 302 may comprise a first associated user cost 316. The first associated user cost 316 may comprise multiple virtual items that the user is required to provide in order to accept the first offer 302. In some implementations, the user may be required to provide quantities of the different virtual items required of the user to accept the offer 302. In some implementations, the user may be required to select which of the quantities of virtual items 320 the user will provide to accept the offer. In the example, shown in FIG. 3, the first associated user cost 314 comprises either one thousand five hundred Aetherstones or one Special Gem. In some implementations, for users who do not wish to provide the requested virtual items, the users may provide different virtual items, such as currency. Such currency may be in the form of precious metal, gems 322, credits 324, and/or other virtual currencies. The interface 300 may include one or more user-selectable buttons 326 configured to facilitate acceptance or rejection of the offer by the user. The interface 300 may comprise other user-selectable buttons and/or user-enterable fields. The interface 300 may be configured to facilitate the user selecting and/or entering the types and quantities of the virtual items associated with the user cost associated with the offer 302. In some implementations the virtual items of the associated cost will be set, and the user will have to provide the set virtual items associated with the user cost of the offer.

The virtual item component 140 may be configured to increase a level value of one or more benefit metrics of the affiliation game units. The virtual item component 140 may increase the level value of the one or more benefit metrics in response to the users in the affiliations providing one or more virtual items. For example, a first level value of a first benefit metric of the first affiliation game unit may be increased in response to the first user providing one or more virtual items. The first level value of a first benefit metric of the first affiliation game unit may be increased in response to the first user and the second user providing one or more virtual items.

Figure 4:
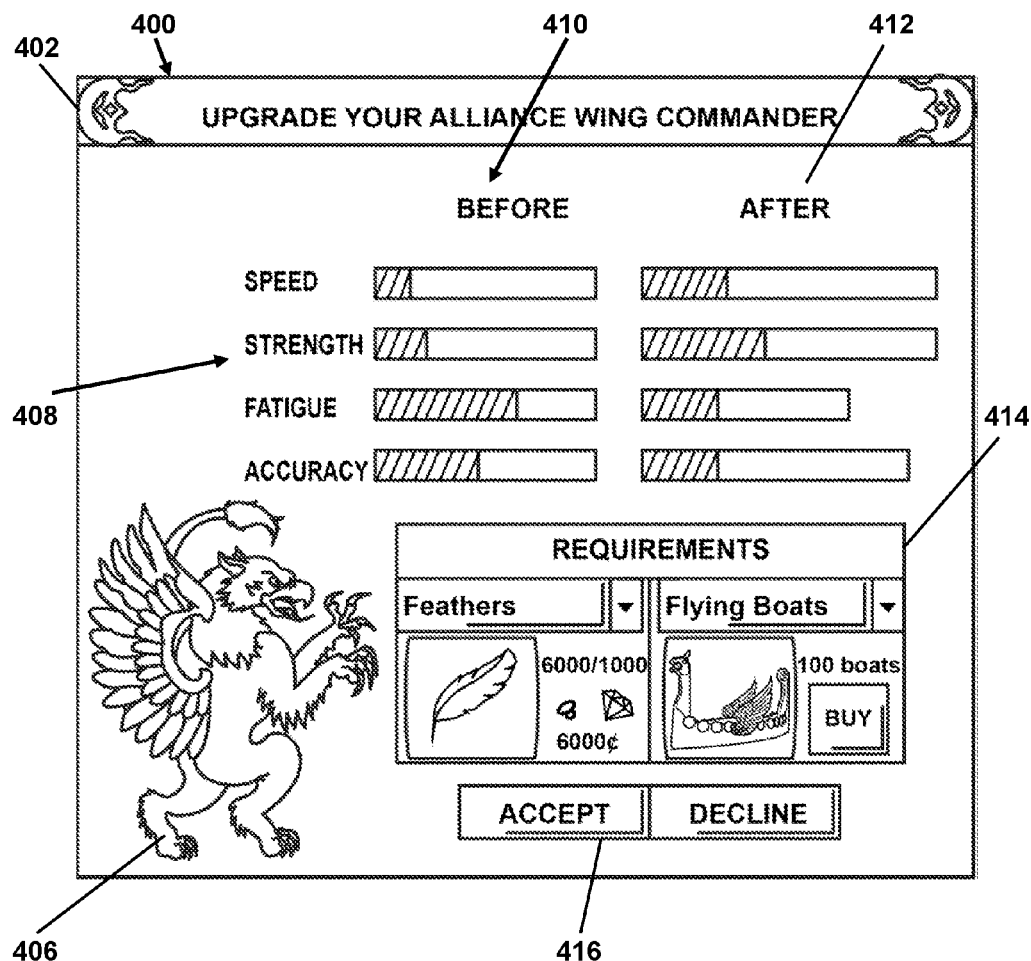
FIG. 4 illustrates an interface for providing offers to users having an affiliation for upgrading affiliation game units, in accordance with one or more implementations.

FIG. 4 illustrates an interface 400 for providing offers to users having an affiliation for upgrading affiliation game units 406, in accordance with one or more implementations.

The upgrade interface 400 may comprise an offer 402 for upgrading affiliation game units possessed by members of the affiliation. The upgrade interface 400 may comprise an indication of the benefit metrics 408 of the affiliation game unit 406. The upgrade interface 400 may facilitate presentation of an indication of the current level value of the benefit metrics 408 and may facilitate presentation of an indication of the level value of the benefit metrics 408 after acceptance of the offer 402 by the user. For example, the upgrade interface 400 may facilitate presentation of a first set of level values 410 for the benefit metrics 408 of the affiliation game unit 408, and of a second set of level values 412 for the benefit metrics 408 of the affiliation game unit 408, wherein the second set of level values 412 indicate the level values of the benefit metrics 408 after the upgrade offer 402 is accepted by the users.

The upgrade offer 402 may include an associated user cost to accept the upgrade offer. The upgrade interface 400 may facilitate presentation of the associated user cost 414 for accepting the offer, as described above. The upgrade interface 400 may facilitate selection and/or entry by the user of an indication that the user intends to make a purchase of virtual items so that the user has sufficient virtual items to meet the requirements of the offer. For example, the upgrade interface 400 may include a user-selectable button 416 which will launch a virtual shop for facilitating the purchase of in-game virtual items. The user may be able to accept the offer to upgrade the affiliation game unit by providing a virtual currency, real currency, and/or other currency instead of providing the required virtual items. The virtual items required to be provided by the users to accept the upgrade offer 402, or any offer, may relate to the affiliation game unit associated with the offer. Where the affiliation game unit is a military-type affiliation game unit, the members of the affiliation may be required to provide military-type virtual items in order to accept the offer. Where the affiliation game unit is an industrial-type affiliation game unit, the members of the affiliation may be required to provide industrial-type virtual items in order to accept the offer. The upgrade interface 400 may include a user-selectable button 418 to accept or reject the upgrade offer 412.

The amount of increase of the level value of the one or more benefit metrics may be based on the amount of users having the given affiliation that provide one or more virtual items to upgrade the affiliation game unit. The amount of increase of the level value of the one or more benefit metrics of the affiliation game item may be based on the proportion of the user having a given affiliation that has provided one or more virtual items to upgrade the affiliation game unit. The amount of increase of the level value of the one or more benefit metrics of the affiliation game item may be based on the number of users having a given affiliation that have provided one or more virtual items to upgrade the affiliation game unit, exceeding one or more thresholds. The amount of increase of the level value of the one or more benefit metrics of the affiliation game item may be based on the cumulative value of the virtual items provided by the users having a given affiliation to upgrade the affiliation game unit.

The one or more benefit metrics of the one or more affiliation game units may have one or more discrete benefit level values, and the virtual item component 140 may be configured to promote the one or more benefit metrics from a first benefit level value to a second benefit level value in response to a threshold amount of the users having a given affiliation providing a threshold amount of one or more virtual items to promote the one or more affiliation character units. The upgrade offer 402 may include an offer to upgrade all of the benefit metrics 408 of the associated affiliation game unit 406. The upgrade offer 402 may include an offer to upgrade individual ones of the benefit metrics 408 of the associated affiliation game unit 406. The upgrade offer 402 may include an offer to increase the number and/or type of the benefit metrics 408 provided to the user of the affiliation. The upgrade offer 402 may include an offer to modify and/or change the benefit metrics 408 of the affiliation game unit 406.

Figure 5:
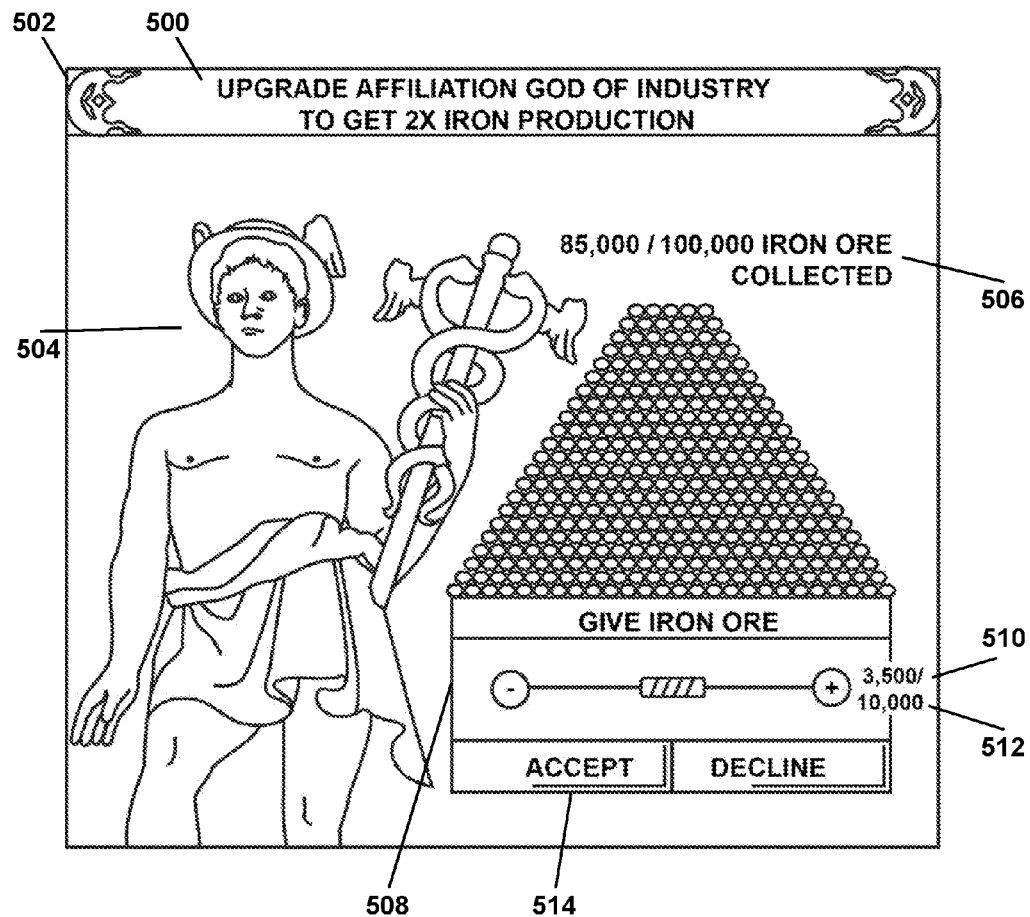
FIG. 5 illustrates an interface for providing offers to users having an affiliation for upgrading affiliation game units, in accordance with one or more implementations.

FIG. 5 illustrates an interface 500 for providing offers 502 to users having an affiliation for upgrading affiliation game units 504, in accordance with one or more implementations. The upgrade offer 500 provided to the members of an affiliation may be an offer to upgrade the affiliation game unit 504 in exchange for the members of the affiliation cumulatively providing an amount of virtual items. FIG. 3 illustrates an interface 300 where the offer to receive the affiliation game unit 304 had to be accepted by a certain amount of the affiliation members. FIG. 5 illustrates an interface 500 where the offer to upgrade the affiliation game unit 504 requires a cumulative amount 506 of virtual items to be provided by the members of the affiliation. The cumulative amount 506 of virtual items may be provided by as few as one of the affiliation members. The upgrade interface 500 may facilitate presentation of the progress toward the required cumulative amount 506 of virtual items required to receive the upgrade of the affiliation game unit 504. The upgrade interface 500 may facilitate selection and/or entry 508 by the user of an amount of the required virtual item that the user wishes to provide to the cumulative total. The upgrade interface 500 may effectuate presentation of the selected and/or entered amount 510 of the required virtual item and the amount 512 of the required virtual item that the user has in his or her inventory. The upgrade interface 500 may effectuate presentation and facilitate interaction with one or more user-selectable buttons 514 configured to facilitate the acceptance or rejection of the upgrade offer 502.

The perceived value of the virtual items required of the users to upgrade the affiliation game unit may increase as the perceived benefit of the level value of the benefit metrics and/or the perceived benefit of the benefit metrics increase.

The virtual items requested from the users in exchange for the affiliation game units may include one or more of resources obtained in the virtual space, attacking troop units, defensive troop units, virtual items obtained in the virtual space, virtual items purchased from a game shop, and/or virtual currency. Virtual currency may take any form, such as coins, experience points, gems, precious stones, precious metals, game items, game units, virtual realms, virtual buildings, and/or other virtual items having a perceived value in the virtual space and/or online game.

The distribution component 155 may be configured to provide the affiliation game units in response to the users having a given affiliation accepting the offer. The distribution component 155 may be configured to provide the affiliation game unit upon the occurrence of one or more of the events described above with respect to the number, amount, threshold, or other measurement of users accepting the offer. For example, the distribution component 155 may be configured to provide the affiliation game unit to one or more members having a given affiliation in response to the number of users accepting the offer exceeding a threshold number of users, exceeding an obtained number of users, or exceeding an obtained percentage of users of the affiliation accepting the offer.

Referring again to FIG. 1, the server 105, client computing platforms 110, secondary servers 115, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 105, client computing platforms 110, and/or external resources 120 may be operatively linked via some other communication media. The processors 160 may be configured to execute computer program components. The processors 160 may be configured to execute the computer program components via one or more of hardware, software, and/or firmware. Although system 100 may be described in certain sections herein as including secondary servers 115, this is not intended to be limiting. The secondary servers 115 may be separate and distinct from system 100, and may be provided by an entity that is separate from, for example, the entity providing secondary servers 115. In some implementations, the functionality attributed herein to the server 105, client computing platforms 110, secondary servers 115, and one or more other elements may be provided by any of the elements.

A given client computing platform 110 may include one or more processors configured to execute computer program components. The computer program components may be configured to enable an expert or user associated with the given client computing platform 110 to interface with system 100 and/or external resources 120, and/or provide other functionality attributed herein to client computing platforms 110. By way of non-limiting example, the given client computing platform 110 may include one or more of a desktop computer, a laptop computer, a handheld computer, a tablet computing platform, a NetBook, a Smartphone, a gaming console, and/or other computing platforms.

The external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

The server 105 may include electronic storage 165, one or more processors 160, and/or other components. The server 105 may include communication lines, or ports to enable the exchange of information with a network and/or other computing platforms. Illustration of server 105 in FIG. 1 is not intended to be limiting. Electronic storage 165 may comprise electronic storage media that electronically stores information. The electronic storage media of electronic storage 165 may include one or both of system storage that is provided integrally (i.e., substantially non-removable) with server 105 and/or removable storage that is removably connectable to server 105 via, for example, a port (e.g., a USB port, a firewire port, etc.), or a drive (e.g., a disk drive, etc.). Electronic storage 165 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 165 may include one or more virtual storage resources (e.g., cloud storage, a virtual private network, and/or other virtual storage resources). Electronic storage 165 may store software algorithms, information determined by processor 160, information received from server 105, information received from client computing platforms 110, and/or other information that enables server 105 to function as described herein.

Processor(s) 160 may be configured to provide information processing capabilities in server 105. As such, processor 160 may include one or more of a digital processor, an analog processor, a digital circuit designed to process information, an analog circuit designed to process information, a state machine, and/or other mechanisms for electronically processing information. Although processor 160 is shown in FIG. 1 as a single entity, this is for illustrative purposes only. In some implementations, processor 160 may include a plurality of processing units. These processing units may be physically located within the same device, or processor 160 may represent processing functionality of a plurality of devices operating in coordination. The processor 160 may be configured to execute components 125, 130, 135, 140, 145, 150, 155, and/or other components. Processor 160 may be configured to execute these components by software; hardware; firmware; some combination of software, hardware, and/or firmware; and/or other mechanisms for configuring processing capabilities on processor 160.

It should be appreciated that although components 125, 130, 135, 140, 145, 150, and 155 are illustrated in FIG. 1 as being co-located within a single processing unit, in implementations in which processor 160 includes multiple processing units, one or more of components 125, 130, 135, 140, 145, 150, 155, and/or other components may be located remotely from the other components. The description of the functionality provided by the different components 125, 130, 135, 140, 145, 150, 155, and/or other components described herein is for illustrative purposes, and is not intended to be limiting, as any of components 125, 130, 135, 140, 145, 150, 155, and/or other components may provide more or less functionality than is described. For example, one or more of components 125, 130, 135, 140, 145, 150, 155, and/or other components may be eliminated, and some or all of its functionality may be provided by other ones of components 125, 130, 135, 140, 145, 150, 155, and/or other components. As another example, processor 160 may be configured to execute one or more additional components that may perform some or all of the functionality attributed herein to one of components 125, 130, 135, 140, 145, 150, 155, and/or other components.

Figure 6:
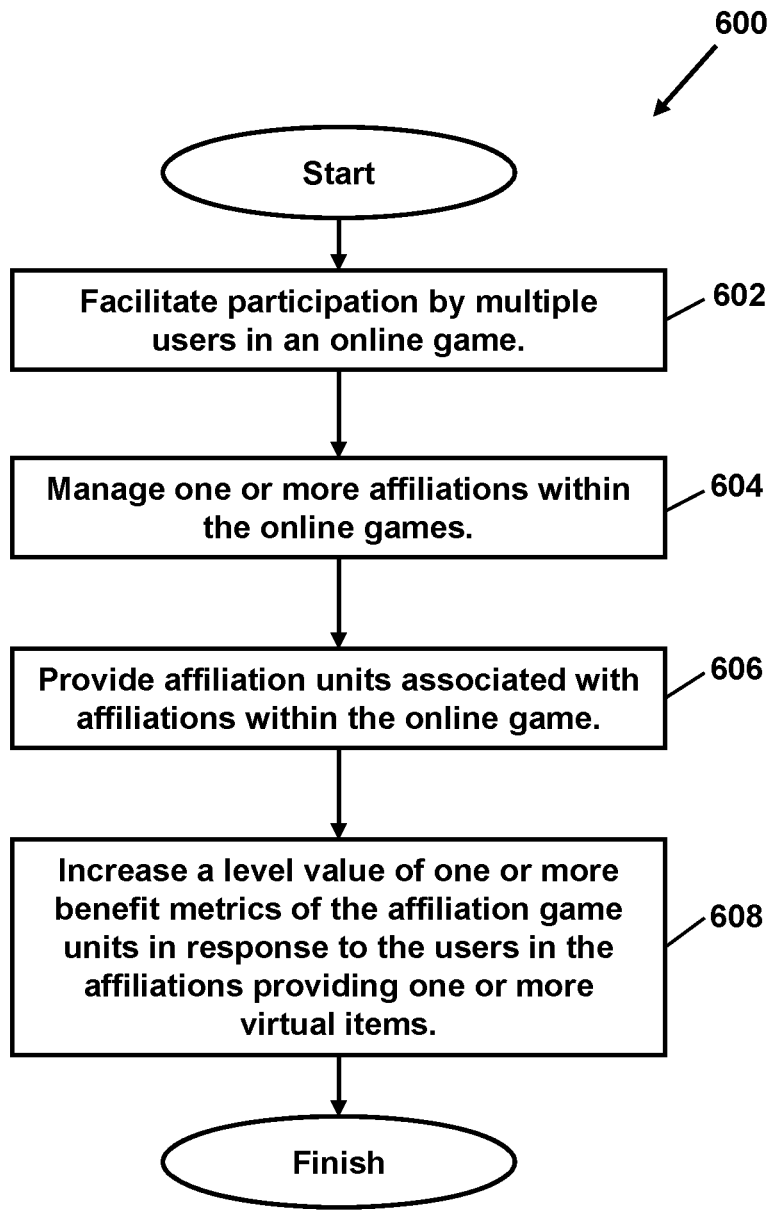
FIG. 6 illustrates a method for providing virtual items to users of an online game, in accordance with one or more implementations.

FIG. 6 illustrates a method 600 for providing virtual items to users of an online game, in accordance with one or more implementations. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, participation by multiple users in an online game may be facilitated. Facilitating participation by multiple users in the online game may be done through client computing platforms associated with the users. The operations at 602 may be performed by a space component, such as space component 125 shown in FIG. 1, in accordance with one or more implementations.

At an operation 604, one or more affiliations within the online game may be managed. The one or more affiliations may comprise a discrete group of users with a relationship having a functional significance within the online game that has an impact on game play, wherein the affiliations comprise a first affiliation within a first online game between a group of users including a first user and a second user. The relationship having a functional significance may include one or more of a leadership role, a controller role, a mentorship role, and/or an administrator role. The operations at 604 may be performed by a relationship component, such as relationship component 135 shown in FIG. 1, in accordance with one or more implementations.

At an operation 606, affiliation game units associated with affiliations within the online game may be provided to affiliation members. The affiliation game units may be controllable in the online game by individual ones of the users in the affiliations with which they are associated. The affiliation game units may include a first affiliation game unit associated with the first affiliation. In some implementations the affiliation game units may be controllable in the online game by select individual members of the affiliation. In other implementations, the affiliation game units may be controllable by multiple members of the affiliation. The first affiliation game unit may be controllable by both the first user and the second user by virtue of their inclusion in the first affiliation. The operations at 606 may be performed by a virtual item component, such as virtual item component 140 shown in FIG. 1, in accordance with one or more implementations.

At an operation 608, a level value of one or more benefit metrics of the affiliation game units may be increased. The level values of the one or more benefit metrics may be increased in response to the users in the affiliations providing one or more virtual items, such that a first level value of a first benefit metric of the first affiliation game unit may be increased in response to the first user and the second user providing one or more virtual items. The amount of increase in the level value may be based on the amount of users having the given affiliation that provide one or more virtual items to increase the level of the one or more benefit metrics of a given affiliation unit and based on the amount of one or more virtual items provided by the users having the given affiliation. The operations at 608 may be performed by a virtual item component, such as virtual item component 140 shown in FIG. 1, in accordance with one or more implementations.

Figure 7:
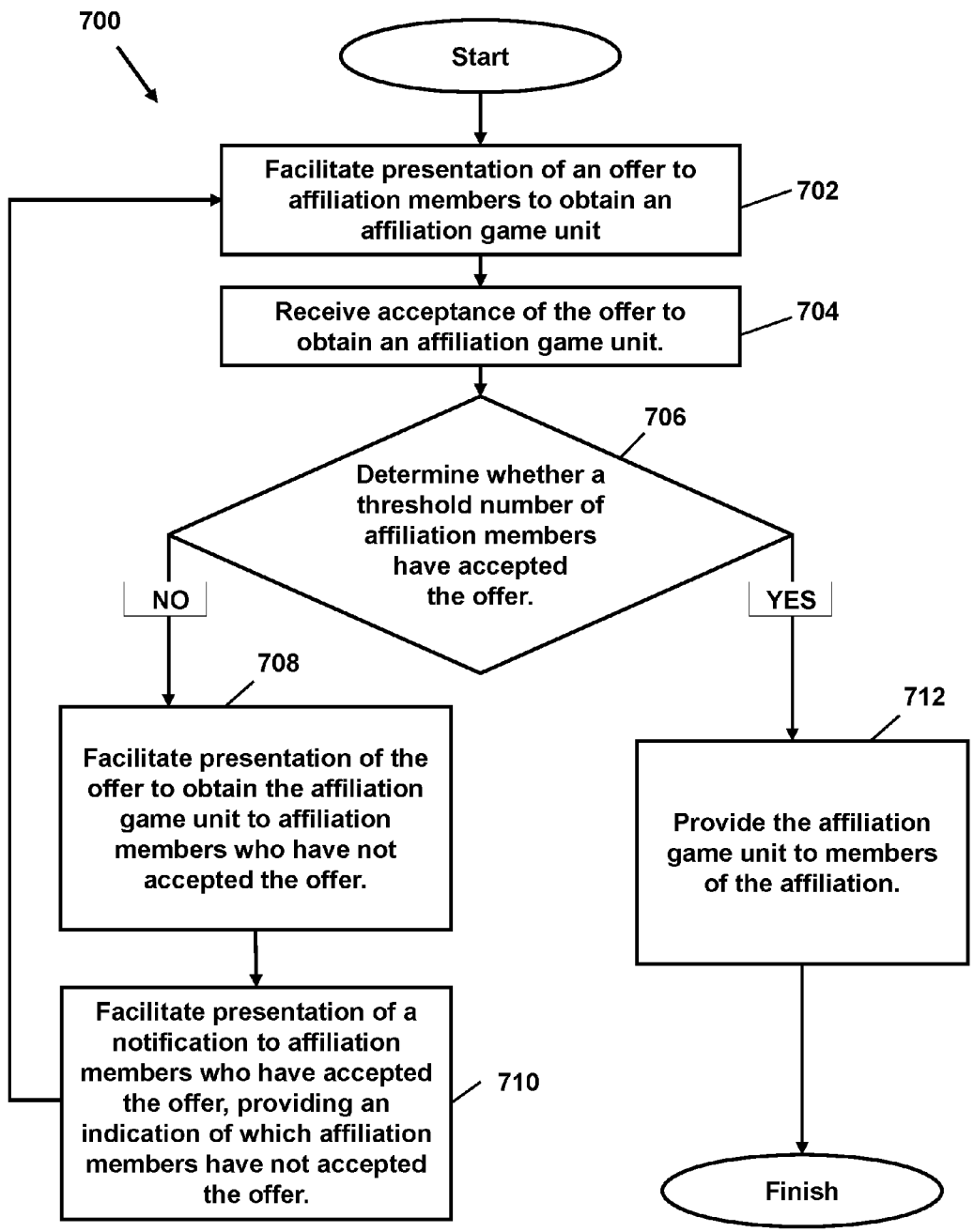
FIG. 7 illustrates a method for providing offers to users to obtain affiliation game units, in accordance with one or more implementations; and, FIG. 8 illustrates a method for determining an upgrade for affiliation game units, in accordance with one or more implementations.

FIG. 7 illustrates a method 700 for providing offers to users to obtain affiliation game units, in accordance with one or more implementations. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, presentation of offers may be effectuated to the users having a given affiliation, wherein the offers include providing one or more virtual items to increase a benefit level of the one or more benefit metrics of the given affiliation unit associated with the given affiliation. An offer may be provided to the users of the first affiliation to provide one or more virtual items for increasing the first benefit level of the first benefit metric of the first affiliation unit associated with the first affiliation. In some implementations, at an operation 702, the offers may include providing one or more affiliation game units to users having a given affiliation. The offers to the users having a given affiliation may include offers to purchase one or more virtual items in exchange for increasing the benefit level of the one or more benefit metrics of the given affiliation game character associated with the given affiliation. The operations at 702 may be performed by an offer component, such as offer component 145 shown in FIG. 1, in accordance with one or more implementations.

At an operation 704, acceptance of the offers to the users having the affiliation may be received. The operations at 704 may be performed by an offer component, such as offer component 145 shown in FIG. 1, in accordance with one or more implementations.

At an operation 706, determination of whether a threshold number of affiliation members have accepted the offer may be made. The threshold number of affiliation members may be a number of members, a percentage of members, a threshold of members, and/or other measurements of the proportion of members who have accepted the offer to obtain and/or upgrade the affiliation game unit. The operations at 704 may be performed by an offer component, such as offer component 145 shown in FIG. 1, in accordance with one or more implementations. The operations at 706 may be performed by an offer component, such as offer component 145 shown in FIG. 1, in accordance with one or more implementations.

In response to determining that the number of affiliation members who have accepted the offer has not breached the threshold, at an operation 708, presentation of the offer to obtain the affiliation game unit to affiliation members may be effectuated. In some implementations, notifications to members who have not accepted the offer may be effectuated, wherein the notifications provide encouragement to users to accept the offer. The operations at 708 may be performed by an offer component and/or a notification component, such as offer component 145 and/or notification component 150 shown in FIG. 1, in accordance with one or more implementations.

In response to determining that the number of affiliation members who have accepted the offer has not breached the threshold, at an operation 710, presentation of notifications to members of the affiliation who have accepted the offer may be effectuated. The notifications may provide an indication of the identity of the affiliation members who have not accepted the offer. The notifications may provide an indication that the members who have accepted the offer encourage those who have not accepted the offer to do so. The operations at 710 may be performed by an a notification component, such as notification component 150 shown in FIG. 1, in accordance with one or more implementations.

In response to determining that the number of affiliation members who have accepted the offer has breached the threshold, at an operation 712, the affiliation game unit and/or the upgrade to the affiliation game unit may be provided to members of the affiliation. The operations at 712 may be performed by an a distribution component, such as distribution component 155 shown in FIG. 1, in accordance with one or more implementations.

Figure 8:
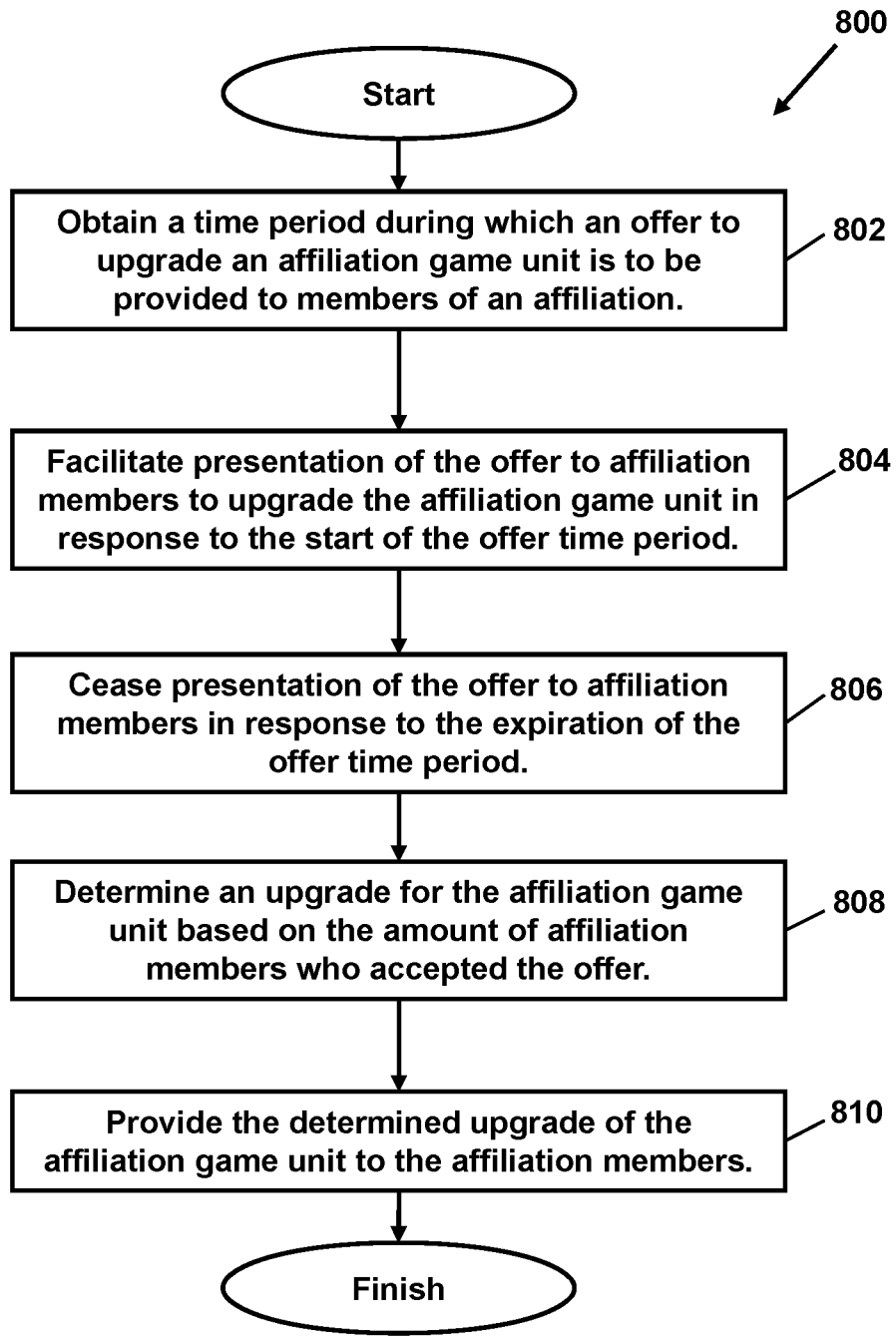

FIG. 8 illustrates a method 800 for determining an upgrade for affiliation game units, in accordance with one or more implementations. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

In some embodiments, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, a time period may be obtained during which the offer to provide and/or upgrade one or more affiliation game units is to be provided to members of an affiliation. The operations performed at the operation 802 may be performed by an offer component, such as offer component 145 shown in FIG. 1, in accordance with one or more implementations.

At an operation 804, presentation of the offer may be facilitated to members of the affiliation, responsive to an indication that the time period, obtained at the operation 802, has commenced. The operations performed at the operation 804 may be performed by an offer component, such as offer component 145 shown in FIG. 1, in accordance with one or more implementations.

At an operation 806, presentation of the offer may be ceased, responsive to an indication that the time period, obtained at the operation 802, expiring. The operations performed at the operation 806 may be performed by an offer component, such as offer component 145 shown in FIG. 1, in accordance with one or more implementations.

At an operation 808, determination of a level and/or type of an affiliation game unit or a level and/or type of upgrade to an affiliation game unit may be made. The determination made at the operation 808 may be based on the amount of affiliation members who accepted the offer during the time period. For example, where a large proportion of the affiliation members accepted the offer, the level/type of the affiliation game unit and/or the amount of upgrade for the affiliation game unit may be relatively high, whereas, where a small proportion of the affiliation members accepted the offer, the level/type of the affiliation game unit and/or the amount of upgrade for the affiliation game unit may be relatively low. A high level and/or type of an affiliation game unit and/or upgrade may translate into a relatively increased benefit to members of the affiliation, wherein the benefit impacts game play in the virtual space. A low level and/or type of an affiliation game unit and/or upgrade may translate into a relatively decreased benefit to members of the affiliation. The operations at 808 may be performed by a distribution component, such as distribution component 155 shown in FIG. 1, in accordance with one or more implementations.

At an operation 810, the affiliation game unit and/or the upgrade determined at operation 808 may be provided to the members of the affiliation. All members of the affiliation may receive the affiliation game unit and/or upgrade. In some implementations, only those members who accepted the offer may receive the affiliation game unit and/or upgrade. The operations at 810 may be performed by an a distribution component, such as distribution component 155 shown in FIG. 1, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system that provides virtual items to users of a virtual space, the system comprising:
   one or more physical processors configured by machine-readable instructions to:
      receive commands over a network from client computing platforms associated with the users;
      perform operations in a game space associated with an online game in response to the commands received over the network from the client computing platforms associated with the users, wherein receiving the commands and performing the operations facilitates participation by multiple users in the online game;
      manage one or more affiliations within the online game, wherein managing the one or more affiliations includes receiving affiliation information over the network form the client computing platforms associated with the users requesting and/or accepting association with the one or more affiliations a given affiliation within the online game comprising a discrete group of users with a relationship having a functional significance within the online game that has an impact on game play, wherein the affiliations comprise a first affiliation within a first online game between a group of users including a first user and a second user;
      transmit game unit information over the network to the client computing platforms that makes game units within the online game available to one or more users in the affiliations, wherein the game units are controllable in the online game by individual ones of the users in the affiliations, the game units including a first game unit available to the first user in the first affiliation;
      increase a level value of one or more benefit metrics of the game units in response to receiving information over the network from the client computing platforms indication one or more of the users in the affiliations provided one or more virtual items, such that a first level value of a first benefit metric of the first game unit is increased in response to receiving information over the network from the first client computing platform associated with the first user providing one or more virtual items.

2. The system of claim 1, wherein the first game unit is controllable by both the first user and the second user by virtue of their inclusion in the first affiliation.

3. The system of claim 1, wherein the amount of increase in the level value is based on the amount of users having the given affiliation that provide one or more virtual items to increase the level of the one or more benefit metrics of a given game unit and based on the amount of one or more virtual items provided by the users having the given affiliation.

4. The system of claim 1, wherein the one or more benefit metrics of the one or more game units have one or more discrete benefit level values and the system is configured to promote the one or more benefit metrics from a first benefit level value to a second benefit level value in response to a threshold amount of the users having a given affiliation providing a threshold amount of one or more virtual items to promote the one or more game units.

5. The system of claim 1, wherein the individual ones of the discrete group of users in the given affiliation that are able to control the one or more game units have a relationship having a functional significance with the other users of the discrete group of users in the given affiliation.

6. The system of claim 3, wherein the relationship having a functional significance includes one or more of a leadership role, a controller role, a mentorship role, and/or an administrator role.

7. The system of claim 1, wherein the individual ones of the discrete group of users in the given affiliation able to control a given game unit includes users having an indication of a priority for controlling the given game unit.

8. The system of claim 1, wherein the one or more physical processors are configured by machine-readable instructions to effectuate presentation of offers to the users having a given affiliation to provide one or more virtual items to increase a benefit level of the one or more benefit metrics of the given game unit associated with the given affiliation, such that an offer is provided to the users of the first affiliation to provide one or more virtual items for increasing the first benefit level of the first benefit metric of the first game unit.

9. The system of claim 8, wherein the one or more physical processors are configured by machine-readable instructions to effectuate presentation of offers to the users having a given affiliation to purchase one or more virtual items for increasing the benefit level of the one or more benefit metrics of the given game unit.

10. The system of claim 1, wherein the one or more benefit metrics of the given game unit include one or more of a defense metric, an attack metric, a skill metric, a loyalty metric, a moral metric, an energy metric, and/or a speed metric.

11. The system of claim 1, wherein the one or more benefit metrics of the given game unit include one or more of a resource metric and/or a production attack metric.

12. A method for providing virtual items to users of a virtual space, the method to be performed using one or more physical computer processors, the method comprising:

receiving commands over a network from client computing platforms associated with the users;

performing operations in a game space associated with an online game in response to the commands received over the network from the client computing platforms associated with the users, wherein receiving the commands and performing the operations facilitates participation by multiple users in the online game;

managing one or more affiliations within the online game, wherein managing the one or more affiliations includes receiving affiliation information over the network form the client computing platforms associated with the users requesting and/or accepting association with the one or more affiliations a given affiliation within the online game comprising a discrete group of users with a relationship having a functional significance within the online game that has an impact on game play, wherein the affiliations comprise a first affiliation within a first online game between a group of users including a first user and a second user;

transmitting game unit information over the network to the client computing platforms that makes game units within the online game available to one or more users in the affiliations, wherein the game units are available in the online game to individual ones of the users in the affiliations, the game units including a first game unit available to the first user in the first affiliation;

increasing a level value of one or more benefit metrics of the game units in response to receiving information over the network from the client computing platforms indication one or more of one or more of the users in the affiliations provided one or more virtual items, such that a first level value of a first benefit metric of the first game unit is increased in response to receiving information over the network from the first client computing platform associated with the first user providing one or more virtual items.

13. The method of claim 12, wherein the first game unit is controllable by both the first user and the second user by virtue of their inclusion in the first affiliation.

14. The method of claim 12, wherein the amount of increase in the level value is based on the amount of users having the given affiliation that provide one or more virtual items to increase the level of the one or more benefit metrics of a given game unit and based on the amount of one or more virtual items provided by the users having the given affiliation.

15. The method of claim 12, wherein the one or more benefit metrics of the one or more game units have one or more discrete benefit level values and the system is configured to promote the one or more benefit metrics from a first benefit level value to a second benefit level value in response to a threshold amount of the users having a given affiliation providing a threshold amount of one or more virtual items to promote the one or more game units.

16. The method of claim 12, wherein the individual ones of the discrete group of users in the given affiliation that are able to control the one or more game units have a relationship having a functional significance with the other users of the discrete group of users in the given affiliation.

17. The method of claim 12, wherein the relationship having a functional significance includes one or more of a leadership role, a controller role, a mentorship role, and/or an administrator role.

18. The method of claim 12, wherein the individual ones of the discrete group of users in the given affiliation able to control a given affiliation game unit includes users having an indication of a priority for controlling the given game unit.

19. The method of claim 12, further comprising:

effectuating presentation of offers to the users having a given affiliation to provide one or more virtual items to increase a benefit level of the one or more benefit metrics of the given game unit associated with the given affiliation, such that an offer is provided to the users of the first affiliation to provide one or more virtual items for increasing the first benefit level of the first benefit metric of the first game unit.

20. The method of claim 19, further comprising:

effectuating presentation of offers to the users having a given affiliation to purchase one or more virtual items for increasing the benefit level of the one or more benefit metrics of the given game unit.

21. The method of claim 12, wherein the one or more benefit metrics of the given game unit include one or more of a defense metric, an attack metric, a skill metric, a loyalty metric, a moral metric, an energy metric, and/or a speed metric.

22. The method of claim 12, wherein the one or more benefit metrics of the given game unit include one or more of a resource metric and/or a production attack metric.

* * * * *